United States Patent [19]

Harbolt et al.

[11] Patent Number: 4,752,452
[45] Date of Patent: Jun. 21, 1988

[54] AQUEOUS AMMONIA PROCESS AND MIXING APPARATUS THEREFOR

[75] Inventors: Bruce A. Harbolt, Northridge; Perry L. Murata, Torrance, both of Calif.

[73] Assignee: Union Oil Company of California, Los Angeles, Calif.

[21] Appl. No.: 474,003

[22] Filed: Mar. 10, 1983

[51] Int. Cl.$^4$ ............................ B05B 1/14; C01C 1/02
[52] U.S. Cl. .................................. 422/256; 239/424; 422/224; 422/257; 423/352
[58] Field of Search ............ 23/293 R; 137/597, 896; 239/424; 366/150, 177; 422/224, 255–257, 153; 423/260, 352

[56] References Cited

U.S. PATENT DOCUMENTS

| | | | |
|---|---|---|---|
| 364,101 | 5/1887 | Gill et al. | 239/424 |
| 621,248 | 3/1899 | Heller | 239/424 |
| 993,687 | 5/1911 | Jackson | 239/424 |
| 2,701,182 | 2/1955 | Sellers et al. | 62/48 |
| 2,779,662 | 1/1957 | Frey | 422/158 X |
| 2,815,532 | 12/1957 | Braunlich | 137/896 X |
| 2,825,630 | 3/1958 | Berger | 137/3 |
| 2,885,278 | 10/1958 | Adams et al. | 71/88 |
| 2,890,937 | 6/1959 | Bresee | 422/148 |
| 3,008,801 | 11/1961 | Adams | 71/43 |
| 3,295,927 | 1/1967 | Earley | 423/352 |
| 3,389,962 | 6/1968 | Moorhead et al. | 423/352 |
| 3,706,534 | 12/1972 | Verheul et al. | 366/177 X |

FOREIGN PATENT DOCUMENTS

| | | | |
|---|---|---|---|
| 2813865 | 10/1978 | Fed. Rep. of Germany | 422/224 |
| 159801 | 1/1964 | U.S.S.R. | 422/224 |

*Primary Examiner*—Barry S. Richman
*Assistant Examiner*—Michael S. Gzybonski
*Attorney, Agent, or Firm*—Howard R. Lambert; G. Wirzbicki; D. Sandford

[57] ABSTRACT

The invention is a process and apparatus useful for preparing an aqueous ammonia solution at a temperature below the boiling point thereof by single stage dilution of anhydrous ammonia with water. In the invention, an anhydrous ammonia fluid comprising ammonia vapor is mixed with water to provide an aqueous ammonia fluid at a first temperature above the boiling point of said aqueous ammonia fluid, the aqueous ammonia fluid is cooled to a second temperature above the boiling point of said aqueous ammonia fluid, and the cooled aqueous ammonia fluid is then indirectly contacted with liquid anhydrous ammonia to further cool said aqueous ammonia fluid to a temperature below its boiling point and thereby heat the liquid anhydrous ammonia to vaporize at least a portion thereof. The heated anhydrous ammonia fluid is utilized in the process of this invention to provide the aqueous ammonia fluid. An apparatus for carrying out the above process is also described, including a novel mixing nozzle for use in mixing the anydrous ammonia fluid with water to provide an aqueous ammonia fluid at a first temperature above the boiling point of said aqueous ammonia fluid.

5 Claims, 2 Drawing Sheets

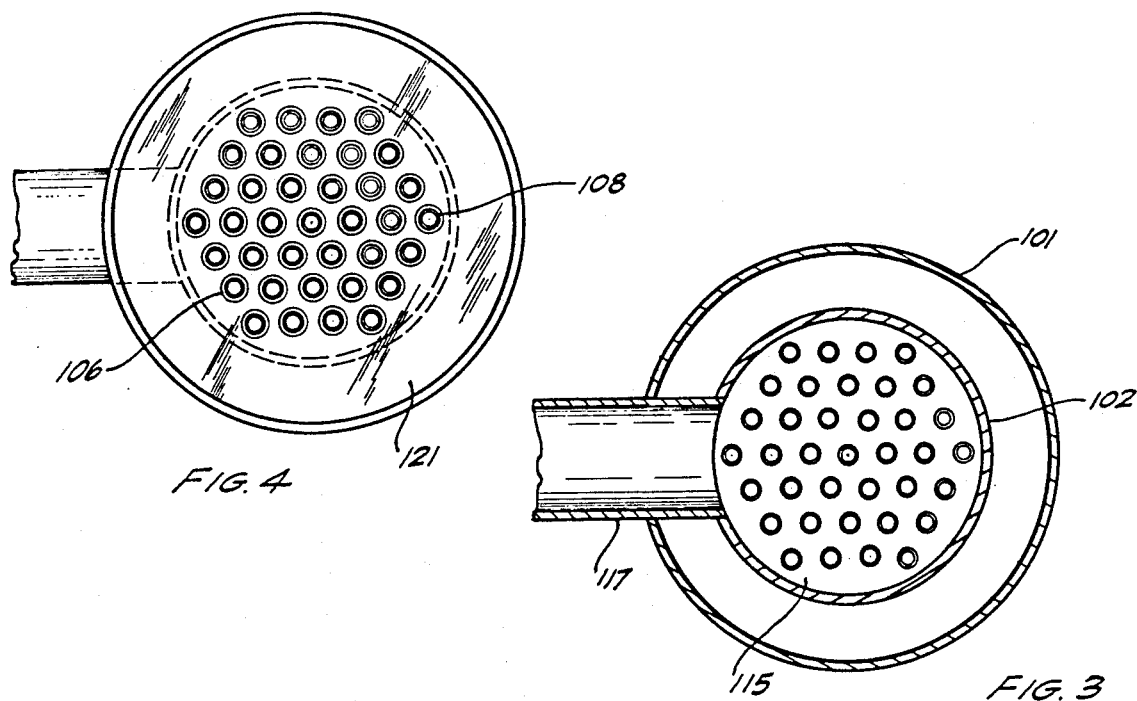
FIG. 4
FIG. 3
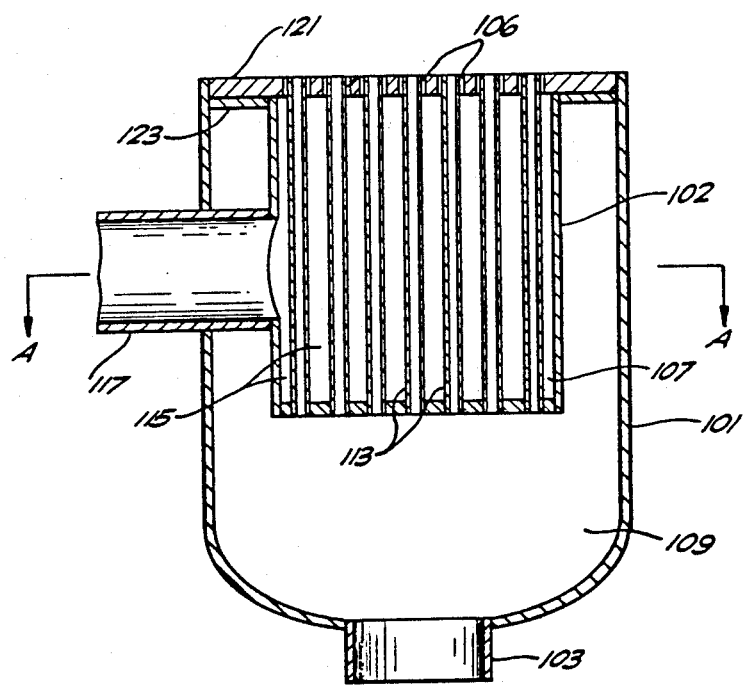
FIG. 2

4,752,452

AQUEOUS AMMONIA PROCESS AND MIXING APPARATUS THEREFOR

BACKGROUND OF THE INVENTION

1. Field of the Invention

This invention relates to a process and apparatus for the production of aqueous ammonia by mixing anhydrous ammonia and water.

2. Background of the Art

This invention has particular application in the liquid fertilizer field in which anhydrous ammonia is mixed with water to produce aqueous ammonia having an ammonia concentration of from about 20 to about 30 percent by weight. In the production of aqueous ammonia, of this strength, considerable quantities of heat are evolved by heat of dilution and the aqueous ammonia solution should be maintained at as low a temperature as possible to avoid loss of ammonia during handling of the product, and to make possible the employment of low pressure apparatus.

The production of aqueous ammonia from water and anhydrous ammonia in large commercial plants encounters few cooling problems because an ample supply of cooling and refrigeration equipment is ordinarily available. However, in case a fertilizer dealer wishes to stock anhydrous ammonia separately and then produce aqueous ammonia as needed, the problem of refrigerating or cooling the aqueous ammonia is a real one. Ordinarily, in this latter situation, commercial plant-type refrigeration is not available, nor is the capital investment to construct it warranted. Therefore it would be very desirable to have an efficient process and apparatus for making aqueous ammonia from anhydrous ammonia which required only a minimum number of relatively simple operating steps and units.

In U.S. Pat. No. 2,890,937 a method for cooling an aqueous ammonia solution below its boiling point is disclosed which requires spraying water on the external surface of an aqueous ammonia storage tank. It should be noted that while this method is relatively simple, it is also a very inefficient method for cooling an aqueous ammonia solution because the ratio of surface area of the tank to the volume of the solution is much too low for efficient heat exchange through the storage tank wall.

In U.S. Pat. No. 2,825,630 a coolant is utilized to remove heat of dilution from a hot aqueous ammonia solution, by contacting the hot aqueous ammonia solution with a coolant in an indirect heat exchange step. The requirement of a coolant to remove the heat of dilution necessitates the maintenance and storage of a third material (the coolant) in addition to anhydrous ammonia and water. An efficient cooling process that eliminates the coolant would be simpler and therefor more desirable.

In U.S. Pat. No. 2,701,182 a process for preparing aqueous ammonia from anhydrous ammonia is disclosed which utilizes a multi-stage dilution of anhydrous ammonia with water wherein the initial pressure is sufficient to maintain the aqueous ammonia solution in a liquid form. A single stage dilution and the elimination of the initial pressure requirement of this process would be more desirable in that the number of operating steps and units would be decreased and less sophisticated equipment would be required.

In U.S. Pat. No. 3,295,927 a process is disclosed for the preparation of aqueous ammonia wherein the hot aqueous ammonia solution is heat exchanged with incoming process water to raise the temperature of the water prior to mixing with anhydrous ammonia. It is also disclosed that the hot aqueous ammonia solution may be heat exchanged, additionally, with anhydrous ammonia to raise the temperature of the anhydrous ammonia prior to mixing with the heated incoming water. Again, this requirement of additional operating steps and units defeats the purpose of providing a simple and efficient process for making aqueous ammonia.

U.S. Pat. No. 2,855,278 teaches a process for the preparation of aqueous ammonia from anhydrous ammonia. It is taught that a hot aqueous ammonia solution may be indirectly heat exchanged with anhydrous ammonia in a single cooling step; however, the process of this patent requires the multi-step dilution of anhydrous ammonia into water and thus would be more suitable for the large scale production of ammonia rather than the production of aqueous ammonia on a relatively small scale as needed by a fertilizer dealer.

U.S. Pat. No. 3,008,801 also teaches a multi-stage dilution process for the preparation of aqueous ammonia from anhydrous ammonia. In this process anhydrous ammonia, which has been heated by indirect heat exchange with a hot aqueous ammonia solution, is first diluted with water in a spray tower to provide an aqueous ammonia solution at about 200° F. The hot aqueous ammonia solution is then sent through an air fin heat exchanger to cool such solution to about 160° F., and then the cooled aqueous ammonia solution is divided and one part sent to the spray tower for a second dilution and the other part utilized to heat the anhydrous ammonia.

It is clear from the above that previous workers in the field have relied on multi-stage dilution or very sophisticated refrigeration and cooling equipment and procedures to remove the heat of dilution generated during the preparation of aqueous ammonia solutions having an ammonia concentration suitable for use as a liquid fertilizer.

Therefore, one object of the instant invention is to provide an improved process and apparatus for the production of aqueous ammonia at a strength suitable for use as a liquid fertilizer.

Another object is to provide an apparatus for forming aqueous ammonia which is of such simplicity that it can readily be made available in mobile form so that anhydrous ammonia can be converted into aqueous ammonia at any point at which the requisite constituents are available.

Another object is to reduce the cost of aqueous ammonia by reducing or eliminating expenses incident to the transportation of large volumes of water.

Another object is to eliminate the conventional requirement for an independent heat source to vaporize liquid anhydrous ammonia in conventional aqueous ammonia producing processes.

Another object is to eliminate the conventional requirement for elaborate refrigeration equipment in the production of aqueous ammonia involving the dilution of anhydrous ammonia into water.

Further objects and advantages are to provide improved steps, elements, and arrangements thereof in a process effective in accomplishing the intended purposes.

Other objects and advantages of the instant invention will become apparent from a careful reading of the specification below.

SUMMARY OF THE INVENTION

Accordingly, the instant invention provides a process and an apparatus for the production of aqueous ammonia at a temperature below the boiling point thereof by single stage dilution of anhydrous ammonia with water. In the process of this invention an anhydrous ammonia fluid comprising ammonia vapor is mixed with water to provide an aqueous ammonia fluid at a first temperature above the boiling point thereof. The aqueous ammonia fluid is then cooled, by indirect heat exchange, e.g. by indirectly contacting the aqueous ammonia fluid with a flowing fluid comprising water droplets dispersed in water saturated air, to a second temperature above the boiling point thereof. The cooled aqueous ammonia fluid is further cooled to a temperature below its boiling point by indirect heat exchange with liquid anhydrous ammonia, whereby the liquid anhydrous ammonia is heated to vaporize at least a portion thereof. The heated anhydrous ammonia is utilized as the above-described anhydrous ammonia fluid and the aqueous ammonia is recovered as an aqueous ammonia solution.

An apparatus for carrying out the above process includes a mixing unit for mixing the anhydrous ammonia fluid with water to provide an aqueous ammonia fluid at a first temperature above the boiling point thereof, and first and second heat exchangers for sequentially cooling said aqueous ammonia fluid to a second temperature above the boiling point thereof, and to a temperature below the boiling point thereof, respectively.

The mixing unit includes a confined mixing chamber fluid-tightly connected to a mixing nozzle and adapted to receive an aqueous ammonia fluid discharge therefrom. The mixing nozzle comprises an outer housing and an inner housing defining separate chambers within said outer housing. The first chamber lies within said inner housing and the second chamber is defined by the space between said inner housing and the walls of said outer housing. The mixing nozzle further includes a plurality of tubes within the first chamber, said tubes being in fluid communication with said second chamber, and being spaced one from another so as to provide an interstitial space between said tubes. An anhydrous ammonia inlet is provided by a fluid conduit which communicates with said second chamber through the walls of said outer housing, and a water inlet is provided by a fluid conduit which communicates with said interstitial space through the walls of said inner and outer housing.

The mixing nozzle preferably includes a perforated disc which is secured to said outer housing. The perforations of said perforated disc are circular and of slightly greater diameter than the tubes whereby the tubes may extend into the perforations and be spaced therefrom to provide an annular space, between each tube and the circumference of a perforation, for discharge of water from said interstitial space.

BRIEF DESCRIPTION OF THE DRAWINGS

The invention will be more readily understood by reference to the drawings wherein like numerals refer to like elements and in which:

FIG. 2 is a longitudinal cross-sectional view of a preferred mixing nozzle that may be utilized in the novel apparatus of this invention;

FIG. 3 is a transverse cross-sectional view taken along line A—A of FIG. 2; and

FIG. 4 is a top view of the mixing nozzle of FIGS. 2 and 3.

DETAILED DESCRIPTION OF THE INVENTION

Figure 1:
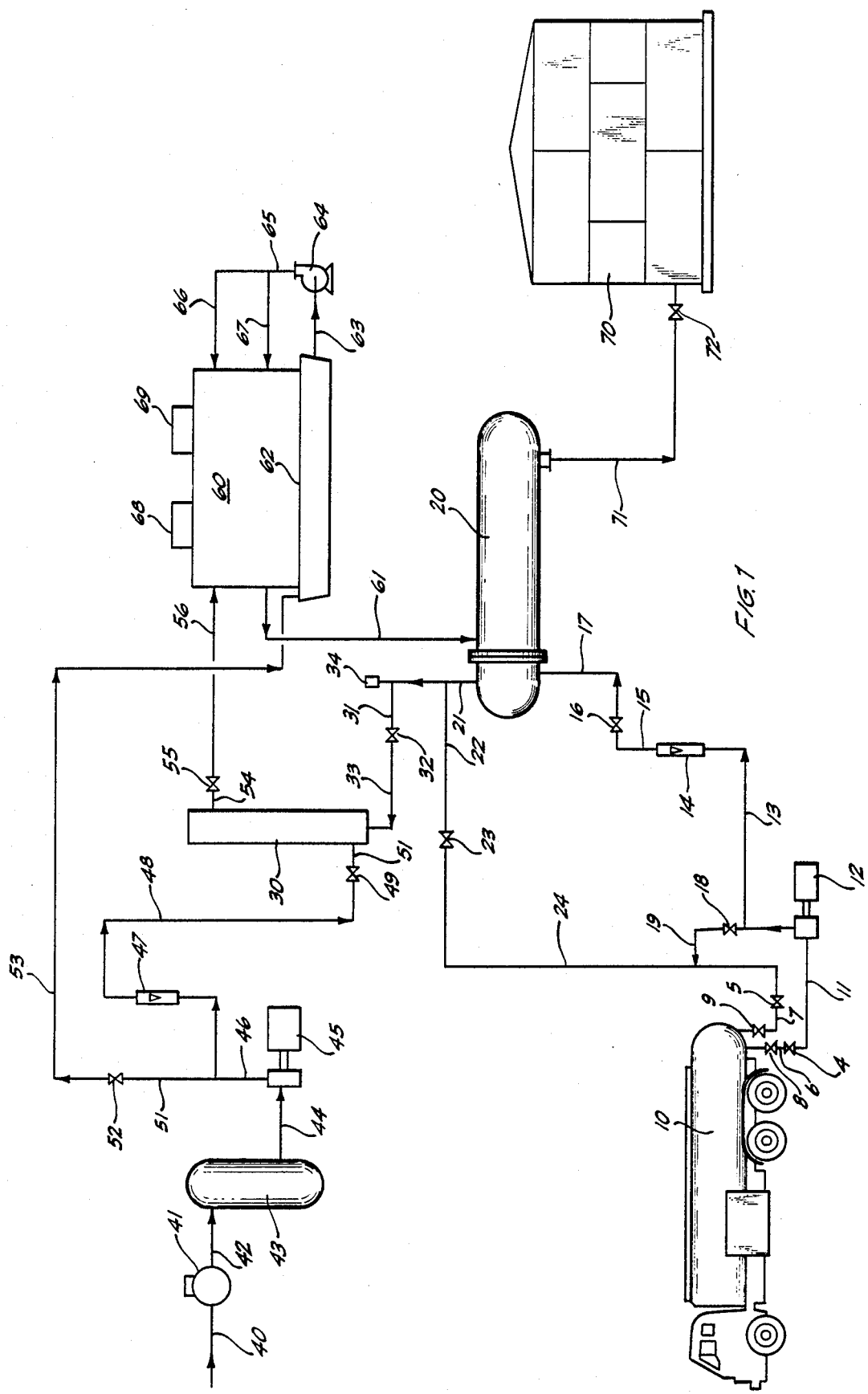
FIG. 1 is a schematic diagram illustrating the process and apparatus of the instant invention.

Referring now to FIG. 1 of the drawing, a pressurized storage tank such as an ammonia tank car or tank truck 10 is fitted with an exit valve 8 and a return valve 9, which are adapted to couple to flexible hoses 6 and 7, respectively. The opposite ends of said hoses are fitted with valves 4 and 5, respectively, which valves are adapted to couple to fluid conduits 24 and 11. Valve 4 may be a bleed-off valve to provide a means for venting air from hose 6 prior to delivery of anhydrous liquid ammonia to the process and apparatus of the invention.

The anhydrous liquid ammonia is passed from tank truck 10 (via hose 6) through conduit 11, pump 12, conduit 13, flow meter 14, conduit 15, valve 16 and conduit 17 to heat exchanger 20. Flow meter 14 is capable of measuring 100 gallons per minute, valve 16 is used to regulate flow of the liquid anhydrous ammonia, and pump 12 is capable of passing said anhydrous liquid ammonia into heat exchanger 20 at a rate suitable for cooling the aqueous ammonia solution from heat exchanger 60 (introduced into heat exchanger 20 via conduit 61) to a temperature of from about 60° to about 90° F. Also provided in conduit 13 is a by-pass valve 18 which may be utilized to pass any ammonia vapor back to tank truck 10 via fluid conduits 19 and 24 and flexible hose 7.

Heat exchanger 20 may be a shell and tube-type heat exchanger or other equivalent heat exchanger. The anhydrous liquid ammonia from tank truck 10 is initially at a temperature of less than above 75° F. but, upon indirect contact with the aqueous ammonia solution introduced into heat exchanger 20 via conduit 61, is heated to thereby provide an anhydrous ammonia fluid wherein at least a portion of said fluid is ammonia vapor. Typically at least about 10 percent by weight of the anhydrous liquid ammonia is converted to vapor in heat exchanger 20, and preferably at least about 20 percent by weight of the anhydrous liquid ammonia is vaporized.

The anhydrous ammonia fluid is passed from heat exchanger 20 to mixing unit 30 through conduit 21, conduit 31, valve 32 and conduit 33. Valve 32 may be used to isolate heat exchanger 20 from the mixing unit 30. A pressure relief valve 34 may be interposed in conduit 21 for safety. A portion of the anhydrous ammonia fluid is returned to tank truck 10, through conduit 22, valve 23, conduit 24 and the aforementioned valve 5, hose 7 and return valve 9, to maintain the pressure in the tank truck. Valve 23 may be used to regulate the return flow to tank truck 10.

The mixing unit 30 preferably includes a mixing nozzle (as described below) in fluid communication with a confined mixing chamber. The anhydrous ammonia fluid is diluted in mixing unit 30 with water to provide an aqueous ammonia solution at a first temperature above the boiling point thereof. For example, the aqueous ammonia solution exiting mixing unit 30 will typically be at a temperature of at least about 150° F. and more preferably at least about 170° F.

Water, for diluting said anhydrous ammonia fluid, is passed to the mixing unit 30 from a source (not shown) through conduit 40, flowmeter 41 and conduit 42 into softener 43 for the removal of hardness and salts which may interfere with the preparation of aqueous ammonia. Flow meter 41 is provided to measure the flow of water to be mixed with the anhydrous liquid ammonia. The softened water from softener 43 is passed through conduit 44, pump 45, conduit 46, flow meter 47, conduit 48, valve 49 and conduit 51 into mixing unit 30 Pump 45 and flow meter 47 are adapted to pump water and measure the flow thereof into mixing unit 30. Valve 49 (optional) may also be utilized to regulate the flow of water into the mixing unit 30. The flow of water to the process of the instant invention may be divided and, a portion thereof, passed through conduit 51, valve 52 and conduit 53 to heat exchanger 60, which is preferably an evaporative cooler as described further below. Valve 52 is utilized to regulate the flow of water to heat exchanger 60.

The confined mixing chambers of the mixing unit 30 may be a bubble tray column or other equivalent unit for homogeneous combination of the water and the anhydrous ammonia fluid to provide an aqueous ammonia fluid-autogeneously heated by the heat of dilution to a first temperature above its boiling point. The mixing chamber is confined to prevent loss of ammonia and is sized to eliminate hydraulic hammer. The hot aqueous ammonia fluid is passed from mixing unit 30 to heat exchanger 60 by means of conduit 54, valve 55 and conduit 56. Valve 55 is utilized to isolate the mixing unit 30 from heat exchanger 60. During opetation of the process of the invention, valve 55 is open.

The preferred heat exchanger 60 is an evaporative cooler wherein the hot aqueous ammonia fluid (at a first temperature above the boiling point thereof) is indirectly heat exchanged with a water saturated, flowing ambient fluid including dispersed water droplets to vaporize said water droplets and cool the hot aqueous ammonia to a second temperature above the boiling point thereof. As shown, cooling water from conduit 53 is passed into a reservoir 62 from which it is pumped through conduit 63, by pump 64 first into conduit 65 and then into conduits 66 and 67. Conduits 66 and 67 each terminate within heat exchanger 60 in a plurality of spray heads (not shown) for spraying droplets of cooling water downward in contact with the external surface of heat exchange tubing (not shown) into said reservoir 62. Meanwhile, fans 68 and 69 placed at the top of the evaporative cooler 60 draw water-saturated, ambient air upwardly through the descending water spray from conduits 66 and 67 to contact the exterior surface of the tubes of heat exchanger 60 through which tubes the hot aqueous ammonia solution is flowing.

The residence time in evaporative cooler 60 and the air and water flow therethrough is adjusted to cool the hot aqueous ammonia solution to a temperature of, for example, about 125° F. to about 135° F. or cooler.

The efficiency of cooling in evaporative cooler 60 is very high due to the difference between the temperature of the flowing ambient fluid and the incoming hot aqueous ammonia fluid. Passing the aqueous ammonia fluid into the evaporative cooler 60 at the higher temperature obtained by diluting an anhydrous ammonia fluid, comprising at least about 10 percent by weight ammonia vapor, with water, rather than diluting liquid ammonia with water, enables the operator to achieve efficient cooling even if the ambient temperature and humidity is relatively high, e.g. over 90° F. and 50 percent, respectively. Moreover, the use of an evaporative cooler (as opposed to the air fin cooler utilized in prior art processes for making aqueous ammonia) enables one to reduce the size (and the cost) of heat exchanger 60. This reduction is a direct result of the effect of liquid as opposed to gas film coefficients in the heat transfer values.

The cooled aqueous ammonia fluid exiting evaporative cooler 60 is passed directly to heat exchanger 20 through conduit 61 and is indirectly heat exchanged with liquid anhydrous ammonia as described above. The cooled aqueous ammonia fluid is further cooled to a temperature below its boiling point, e.g., about 60° to about 90° F., and then passed to storage tank 70 through fluid conduit 71 and valve 72. Valve 72 may be used to isolate storage tank 70 from heat exchanger 20.

The present invention also provides for a novel mixing nozzle for use in mixing unit 30 for mixing the anhydrous ammonia fluid with water and thus provide an aqueous ammonia fluid at a first temperature above the boiling point thereof. The preferred mixing nozzle is shown in FIGS. 2 through 4, which mixing nozzle is adapted to be fluid-tightly connected to a confined mixing chamber (not shown) that is positioned thereabove and adapted to receive an upwardly discharged fluid comprising aqueous ammonia from said mixing nozzle.

The mixing nozzle comprises an outer housing 101 having an anhydrous ammonia fluid inlet 103. An inner housing 102 is mounted within said outer housing so as to define a first chamber 107 within said inner housing and a second chamber 109 around said inner housing. A perforated disc 121 is secured to said outer housing 101 and said inner housing 102, as shown. A plurality of tubes 113 are provided within said inner housing and adapted to provide fluid communication between said second chamber 109 and the confined mixing chamber. The tubes 113 will extend from adjacent said anhydrous ammonia inlet 103 to said perforations 106. The fluid tubes are coaxially aligned and spaced one from another to provide an interstitial volume 115 between the outer surfaces of said hollow tubes and the inner wall of said inner housing 102. The perforations 106 are circular and of slightly greater diameter than the tubes whereby the discharge ends of said tubes 113 may extend into said perforations 106 and be spaced from the circumference thereof to provide an annular space 108 therebetween. A fluid conduit 117 provides communication with the source of water and said interstitial volume 115. Fluid conduit 117 passes through the walls of said outer housing 101 and said inner housing 102 and is in fluid communication with the annular spaces 108 through interstitial volume 115. As shown, a support plate 123 may be affixed about the periphery of said inner housing 102 and utilized to secure said inner housing and said perforated disc 121 to said housing 101.

In operation, water is passed through the interstitial volume 115 and is discharged upwardly through the annular space between the tubes and the perforations. At the discharge end of the tubes, the flowing water is disrupted by the upwardly flowing anhydrous ammonia fluid flow from the discharge of tubes 113 and mixing is thereby provided. The mixing of the water with the anhydrous ammonia fluid is substantially instantaneous and provides, in said confined mixing chamber, an aqueous ammonia fluid, at a temperature above the boiling point, by the autogenous heat of dilution of the anhydrous ammonia fluid with the water.

The invention is further illustrated by the following example which is illustrative of a specific mode of practicing the invention and is not intended as limiting the scope of the appended claims.

EXAMPLE

In accordance with this invention and substantially in accordance with the apparatus, as illustrated in the drawings, anhydrous liquid ammonia at a temperature of from about 40° to about 70° F. and at a flow rate of about 91 gallons per minute is passed into heat exchanger 20 and therein indirectly contacted with an incoming hot aqueous ammonia fluid at a temperature of about 125° to 135° F. to cool said hot aqueous ammonia fluid to a temperature of about 60° to about 90° F. and heat said anhydrous liquid ammonia to provide an anhydrous ammonia fluid comprising about 20 weight percent ammonia vapor. The anhydrous ammonia fluid is passed into the mixing unit 30 and therein diluted with ambient water, incoming at a flow rate of about 174 gallons per minute, to provide an aqueous ammonia fluid at a temperature of about 170° F. The aqueous ammonia fluid at such temperature is above its boiling point and is passed into the evaporative cooler 60 and therein contacted in indirect heat exchange relationship with a flowing ambient fluid including water droplets, descending through an ascending water-saturated, air stream. The aqueous ammonia fluid is thereby cooled to a temperature of from about 125° to about 135° F. The cooled aqueous ammonia fluid is then passed into heat exchanger 20 for heating incoming anhydrous liquid ammonia.

In comparison the same process is carried out without heat exchanging the liquid anhydrous ammonia with the aqueous ammonia fluid from evaporative cooler 60. Thus the anhydrous liquid ammonia is diluted directly with water in the mixing unit to provide an aqueous ammonia fluid at temperature of about 135° to about 145° F. The aqueous ammonia fluid is heat exchanged in said evaporative cooler 60 and an aqueous ammonia fluid at a temperature of about 85° to about 105° F. is recovered. It should be noted that at such temperature the aqueous ammonia fluid would require further cooling to a temperature below the boiling point or a pressurized storage facility would be required to avoid the loss of ammonia.

While particular embodiments of the invention have been described it will be understood of course that the invention is not limited thereto since many obvious modifications can be made and it is intended to include within this invention any such modifications as will fall within the scope of the appended claims. For example, it will be appreciated, by those skilled in the art, that the support plate 123 and the perforated disc 121 may be eliminated from the preferred mixing nozzle of this invention and the anhydrous ammonia fluid thereby discharged directly into the confined mixing chamber from said second chamber 109 as well as through said tubes 113. Moreover by removing the support plate 123 and the perforated disc 121 water may be discharged directly into said confined mixing chamber without passage through annular spaces 108. Finally, said tubes 113 may be sized to terminate in said first chamber 109 or to extend into the confined mixing chamber. The apparatus of the instant invention may be, alternatively, operated to achieve a production rate that is six to eight times the production rate of a similar apparatus that does not utilize a second heat exchanger, such as heat exchanger 20, for contacting the aqueous ammonia fluid from the evaporative cooler with the liquid anhydrous ammonia. When operating at this production rate, of course, the aqueous ammonia fluid will be recovered at a relatively higher temperature of about 80° to about 105° F. rather than at about 60° to about 90° F. However the greater production rate may make further cooling or pressurized storage acceptable to the dealer.

Having now described the invention, we claim:

1. An apparatus for preparing an aqueous ammonia solution at a temperature below the boiling point thereof, by single stage dilution of anhydrous ammonia with water, comprising in sequential, fluid communication:,
   (a) a mixing unit comprising:
      (i) a confined mixing chamber and
      (ii) a mixing nozzle, said confined mixing chamber being fluid-tightly connected to said mixing nozzle said mixing nozzle consisting essentially of an outer housing having an inlet for receiving an anhydrous ammonia fluid and an outlet for discharging an aqueous ammonia fluid into said confined mixing chamber, an inner housing within said outer housing and defining separate chambers within said outer housing, said chambers including a first chamber comprising the space within said inner housing and a second chamber comprising the space between said inner and said outer housing, a plurality of tubes within said first chamber, said tubes providing fluid communication between said second chamber and said confined mixing chamber, and being spaced one from another so as to provide an interstitial volume between said tubes, and an inlet conduit for receiving water in fluid communication with said interstitial volume through the walls of said inner and outer housing,
   (b) a first heat exchanger adapted to cool an aqueous ammonia fluid to a temperature above the boiling point thereof by indirect heat exchange with a flowing ambient fluid,
   (c) a second heat exchanger adapted to further cool said cooled aqueous ammonia fluid by indirect heat exchange with liquid anhydrous ammonia to a temperature below the boiling point thereof and thereby produce an anhydrous ammonia fluid comprising ammonia vapor, and
   (d) a fluid conduit adapted to pass said anhydrous ammonia fluid to said inlet of said mixing nozzle.

2. The apparatus of claim 1 wherein said first heat exchanger comprises a tubular conduit for said aqueous ammonia solution, a water reservoir below said tubular conduit, means for upwardly passing a stream of water saturated air from said water reservoir in contact with the outer surface of said tubular conduit, and means for spraying water droplets downwardly in contact with the outer surface of said tubular conduit.

3. The apparatus of claim 1 further including a perforated disc secured to said inner housing and said outer housing at said outlet, said perforated disc having circular perforations of a diameter greater than the diameter of said tubes, and the discharge end of each of said tubes extending into a perforation and being spaced from the circumference thereof to provide an annular space therebetween.

4. The apparatus of claim 1 further including a perforated disc secured to said inner housing and said outer housing at said outlet, said perforated disc having circular perforations of a diameter greater than the diameter of said tubes, and the discharge end of each of said tubes extending into a perforation and being spaced from the circumference thereof to provide an annular space therebetween, each of said discharge ends of said tubes and the surrounding annular space defining only two fluid pathways for water flowing through said surrounding annular space and anhydrous ammonia flowing through said discharge, end of said tube.

5. An apparatus for preparing an aqueous ammonia solution at a temperature below the boiling point thereof, by single stage dilution of anhydrous ammonia with water, consisting essentially of, in sequential, fluid communication:,
(a) a mixing unit comprising:
 (i) a confined mixing chamber and
 (ii) a mixing nozzle, said confined mixing chamber being fluid-tightly connected to said mixing nozzle, said mixing nozzle comprising an outer housing having an inlet for receiving an anhydrous ammonia fluid, an inner housing within said outer housing and defining separate chambers within said outer housing, said chambers including a first chamber comprising the space within said inner housing and a second chamber comprising the space between said inner and said outer housings, a plurality of tubes within said first chamber, said tubes providing fluid communication between said second chamber and said confined mixing chamber, and being spaced one from another so as to provide an interstitial volume between said tubes, and an inlet conduit for receiving water in fluid communication with said interstitial volume through the walls of said inner and outer housing,
(b) a first heat exchanger adapted to cool the aqueous ammonia fluid to a temperature above the boiling point thereof by indirect heat exchange with a flowing ambient fluid,
(c) a second heat exchanger adapted to further cool said cooled aqueous ammonia fluid by indirect heat exchange with liquid anhydrous ammonia to a temperature below the boiling point thereof and thereby produce an anhydrous ammonia fluid comprising ammonia vapor, and
(d) a fluid conduit adapted to pass said anhydrous ammonia fluid to said inlet of said mixing nozzle.

* * * * *